United States Patent [19]

Helfrich

[11] Patent Number: 5,412,290

[45] Date of Patent: May 2, 1995

[54] 50 HZ PARABOLIC SIGNAL FILTER

[75] Inventor: Kenneth J. Helfrich, Hamilton, Ind.

[73] Assignee: Thomson Consumer Electronics, Inc., Indianapolis, Ind.

[21] Appl. No.: 207,915

[22] Filed: Mar. 8, 1994

[51] Int. Cl.⁶ .......................... G09G 1/04; H03K 4/08
[52] U.S. Cl. .................... 315/371; 315/403; 327/125; 327/133
[58] Field of Search .............. 315/371, 403; 307/228

[56] References Cited

U.S. PATENT DOCUMENTS 3,740,611  6/1973  Slavik ........................... 315/371
4,686,432  8/1987  Berland et al. ................. 315/403

OTHER PUBLICATIONS

SGS Thomson Data Sheet For Tea 2130 Scanning Processor IC, Dated Dec. 1992 pp. 1–8.

Primary Examiner—Gregory C. Issing
Attorney, Agent, or Firm—Joseph S. Tripoli; Joseph J. Laks; Francis A. Davenport

[57] ABSTRACT

A scanning waveform generator for operation at a first or a second scanning frequency comprises a source of a parabolic shaped signal having a frequency selectable between the first or second scanning frequency. A means for generating a switching signal indicative of a video signal operating at one of a first or a second scanning frequency. A means for generating a sawtooth shaped waveform is coupled to the switching signal for switching between the first or the second scanning frequency. A means for generating an S correction signal is coupled to the source and to the sawtooth generating means. A means for filtering the parabolic signal is controllably coupled to the switching signal generator, and is also coupled to the S correction signal generating means. The filtered parabolic signal has an substantially the same shape during the first or second scanning frequency.

20 Claims, 5 Drawing Sheets

50 HZ PARABOLIC SIGNAL FILTER

This invention relates to a video display. operable in multiple TV standards, and in particular to the generation a vertical deflection waveform, and the filtering and control of a parabolic signal.

BACKGROUND OF THE INVENTION

There are similarities between television systems conforming to NTSC, PAL M and PAL N television standards which permit the development of a multiple standard TV display based on an existing NTSC receiver design. Cost and production considerations may dictate that a multistandard TV display be engineered for minimal changes to the basic NTSC receiver design.

An existing NTSC receiver design is based on a digital bus controlled integrated circuit which provides most of the required TV receiver sub-systems, for example, IF amplification, video demodulation, chrominance demodulation and decoding, audio demodulation, sync separation and pulse and waveform generation etc. Hence, a multi-standard circuit design must be interfaced to allow control by the existing system, and to provide compatible output signals for reinsertion into the existing receiver video and synchronizing systems.

The bus controlled integrated circuit may include a count down pulse generation system which is locked to the horizontal synchronizing pulses derived from the selected viewing source. The pulse generation system also produces various corrective signal waveforms which may be generated based on horizontal line counts from a vertical reference time. One such signal is a vertical rate parabola which may be use to provide East-West pincushion correction and is controlled and set via the digital bus.

The NTSC, PAL M and PAL N television standards have similar horizontal synchronizing frequencies and also similar color subcarrier frequencies. In addition both NTSC, PAL M have the same field frequency, nominally 59.94 Hz, with the same number of horizontal lines per frame, 525, which yields the same horizontal frequency, nominally 15,734 KHz. However, the PAL N television standard comprises 625 lines per frame, with a field frequency of 50 Hz. It is these numerical differences which may produce waveform anomalies in a generator based on counting or count down techniques.

In an existing NTSC receiver, pincushion or East-West correction is provided by a vertical rate parabolic shaped signal generated by processing a field rate sawtooth in a squaring circuit. The parabola amplitude is controlled by a feedback loop which is referenced to the instantaneous ramp amplitude occurring at a specific line count. The line count being selected to position the center of the parabola nominally to the center of the field rate ramp or sawtooth. However, when operating in the 50 Hz field rate, PAL N TV standard, the reference line count, or number, is not changed to reflect the greater number of lines in a PAL N field. This results in the generation of a parabolic waveform which is not symmetrically positioned in PAL N field interval. Effectively the parabolic signal is generated to be centered within a 16.66 millisecond field duration, but continues for 20 milliseconds which constitutes the 50 Hz field duration. Thus the peak of the parabola occurs too early in the PAL N field, and the parabola continues to be generated producing an ending cusp of greater magnitude than that of the start.

SUMMARY OF THE INVENTION

A scanning waveform generator for operation at a first or a second scanning frequency comprising a source of a parabolic shaped signal having a frequency selectable between the first or second field frequency. A means for generating a switching signal indicative of a video signal operating at one of a first or a second scanning frequency A means for generating a sawtooth shaped waveform is coupled to the switching signal for switching between the first or the second scanning frequency. A means for generating an S correction signal is coupled to the source and to the sawtooth generating means. A means for filtering the parabolic signal is controllably coupled to the switching signal generator, and is also coupled to the S correction signal generating means. The filtered parabolic signal having substantially the same shape during scanning at either one of the first and second scanning frequencies.

DETAILED DESCRIPTION

Figure 1:
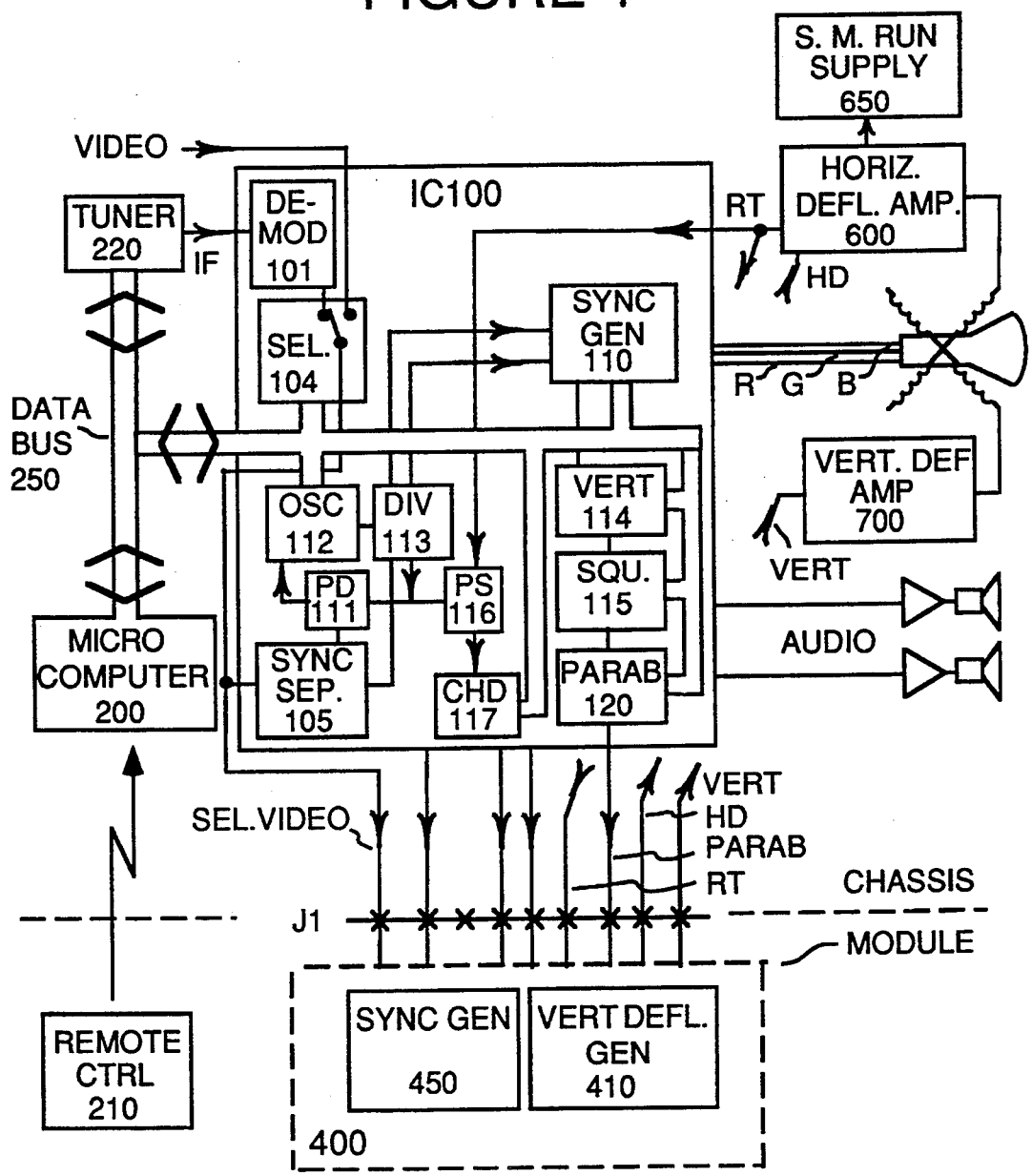
FIG. 1 shows a simplified block diagram of a TV receiver incorporating an inventive multistandard embodiment.

The block diagram of FIG. 1 shows the major subsystems which augment the operation of digital bus controlled integrated circuit IC 100. Integrated circuit IC 100 may receive inputs as modulated I.F. signals or base band composite video, or separate luminance and modulated chrominance signals, Y/C. The IC outputs decoded red green and blue signals for display, together with appropriate deflection waveform signals which are coupled to horizontal and vertical deflection drive amplifiers. The TV FM audio signal is detected and stereo demodulated for coupling to power amplifies which drive loudspeakers.

A microcomputer integrated circuit, IC 200, communicates with IC 100 and tuner unit 220, via a bidirectional data bus 250. Signals from a remote control unit 210 are also inputted to the microcomputer IC 200.

To provide multiple TV standards operation various circuit functions performed by integrated circuit 100 are intercepted and modified or substituted by an inventive circuit 400 which comprises a sync generator 450, and a vertical deflection waveform generator 410.

The inventive circuitry of module 400, is coupled to a video source selected by selector 104. The video may be derived from either demodulator 101, or from a baseband input video signal source. This video signal is sync separated within sync generator 450, which in addition generates a horizontal drive signal appropriate for the input TV standard. The sync generator 450, also determines the vertical frequency of the selected video signal and generates a 50/60 Hz switching signal for control of various synchronizing functions having 50/60 Hz differences. Vertical synchronization is derived from the selected video signal using a count down technique. A switched current source generates a vertical rate sawtooth signal of constant amplitude for both 50 Hz and 60 Hz field rates by charging a capacitor. The capacitor is reset by vertical reset signal generator 460. The vertical sawtooth is processed for linearization and to provide "S" correction. The sync generator 450 generates a horizontal drive signal HD, and the vertical deflection waveform generator 410, generates a corrected vertical deflection sawtooth VERT, for any of the three possible TV standards. In simple terms, the basic receiver functions as originally designed but with the deflection signals derived and generated within circuit 400.

Figure 2:
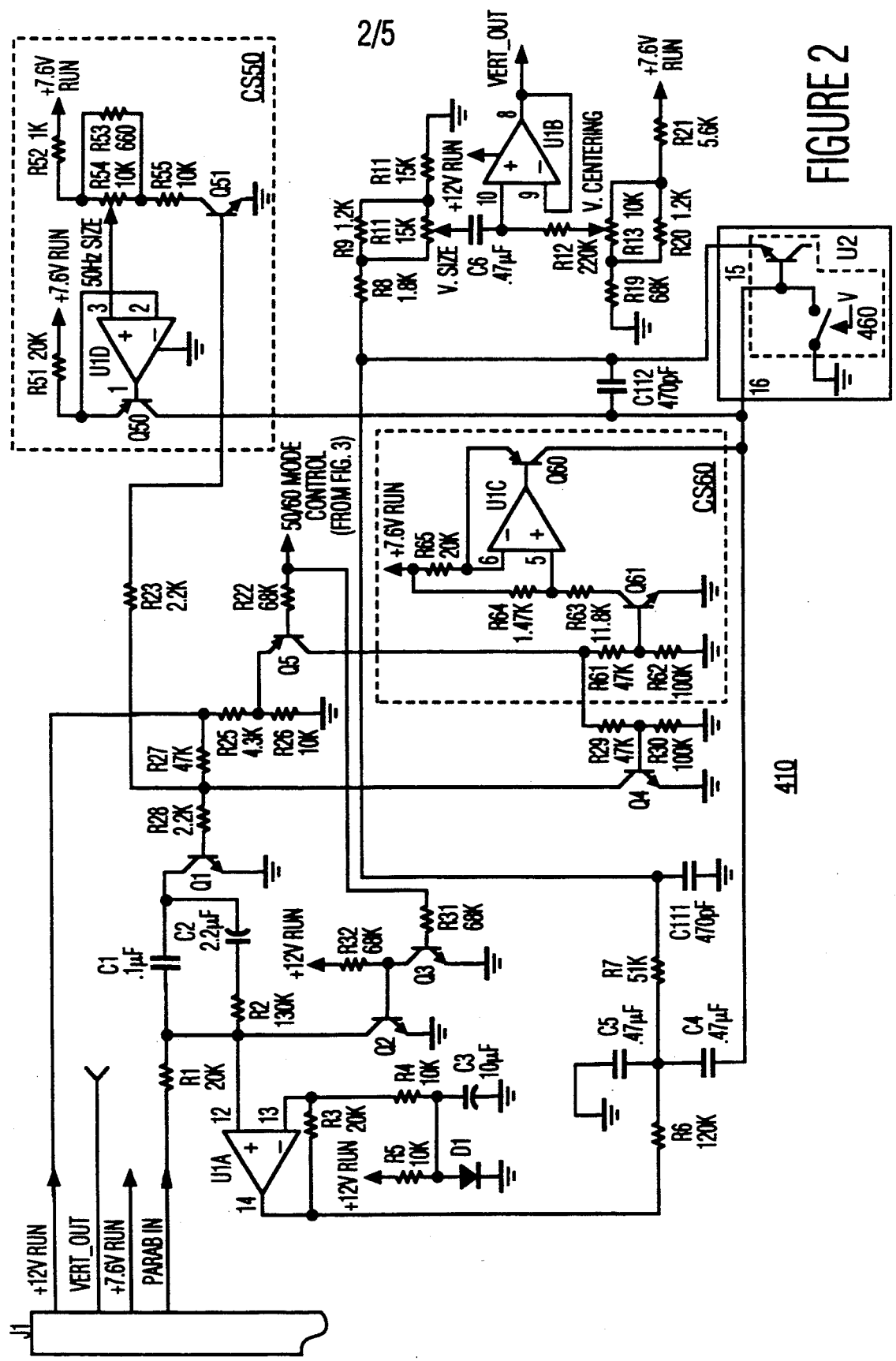
FIG. 2 is an electronic schematic drawing showing circuitry including an inventive circuit 400 of FIG. 1.

Circuitry of module 400 of FIG. 1, may be conveniently divided into two sections, sync generation 450 and vertical deflection waveform generation 410. An electronic schematic of the vertical deflection waveform generator 410 is shown in FIG. 2, with the sync generation section 450 shown in FIG. 3. The sync generator is based on an integrated circuit, for example a TEA 2130, which provides the circuit functions of, sync separation, 32 times horizontal frequency phase locked oscillator, count down for field frequency determination, vertical pulse separation, vertical ramp reset and buffer and a second horizontally phase locked oscillator.

The selected video signal, from selector 104, is coupled via a capacitor C109 to IC U2 pin 19. Within integrated circuit U2, sync signals are separated from the selected video signal by separator 454, the vertical sync being coupled to a vertical frequency detector 455, and the horizontal pulses being coupled to a phase detector 453, as a reference to frequency lock a 32 times horizontal frequency oscillator 451. The oscillator frequency, nominally 500 KHz, is determined by a ceramic resonator X1 connected between pin 17 and ground via a resistor R110. The oscillator signal is divided down in divider 452, and compared in phase detector 453, with separated horizontal pulses to control the oscillator frequency. The oscillator control loop is filtered by a capacitors C105 and C107. Capacitor C105 provides decoupling between pin 3 and ground, and capacitor C107 decouples pin 3 to a positive potential generated by resistors R106, R107 which form a potential divider.

The oscillator signal is counted down further, to generate gating signals between specific counts, in fact between specific line numbers. The gating signals are applied to the vertical frequency detector 455, which operates as follows. A timing window is generated between line counts of 247–277 and this enables or gates only separated vertical pulses having a 60 Hz rate and limited range of phase. In addition, the repetitive occurrence of a separated vertical pulse during line counts of 247–277 indicates the input signal to be at a 60 Hz field rate, this sets the output signal of the 50/60 mode control logic 456, to a nominal value of 6 volts. Similarly a vertical pulse occurring between line counts of 277–361 is indicated to have a 50 Hz field rate and the 50/60 mode control logic 456 output signal is set to nominally 11 volts. When the reference video signal is absent, during tuning etc., the vertical frequency gating logic sets the 50/60 mode control output signal to nominally zero volts.

A horizontal retrace pulse RT, from the main chassis, is coupled via connector J1, to phase detector 458 to provide a horizontal reference for a second phase locked horizontal oscillator and multivibrator 459. The retrace pulse is coupled via a high frequency roll off filter comprising a series connected resistor R24, with a capacitor C117 connected to ground. The horizontal phase of this second oscillator is adjusted by potentiometer R116 which is connected between the IC U2 power supply and ground. The wiper of potentiometer R116 is filtered by a series resistor R114 and shunt connected capacitor C113, and coupled to pin 14 of IC U2. The second horizontal oscillator generates a multistandard horizontal drive signal at pin 11, which is coupled via connector J1 to the horizontal deflection amplifier 600. In the absence of horizontal drive the horizontal deflection amplifier 600 requires that the horizontal drive signal to assume a positive potential. Hence the multistandard horizontal drive signal is coupled via a series resistor R113 to the junction of resistor R115 and capacitor C116. Capacitor C116 is connected to ground to provide HF roll-off and resistor R115 is connected to the 12 volt standby supply to provide a pull-up in the absence of a drive signal.

Figure 3:
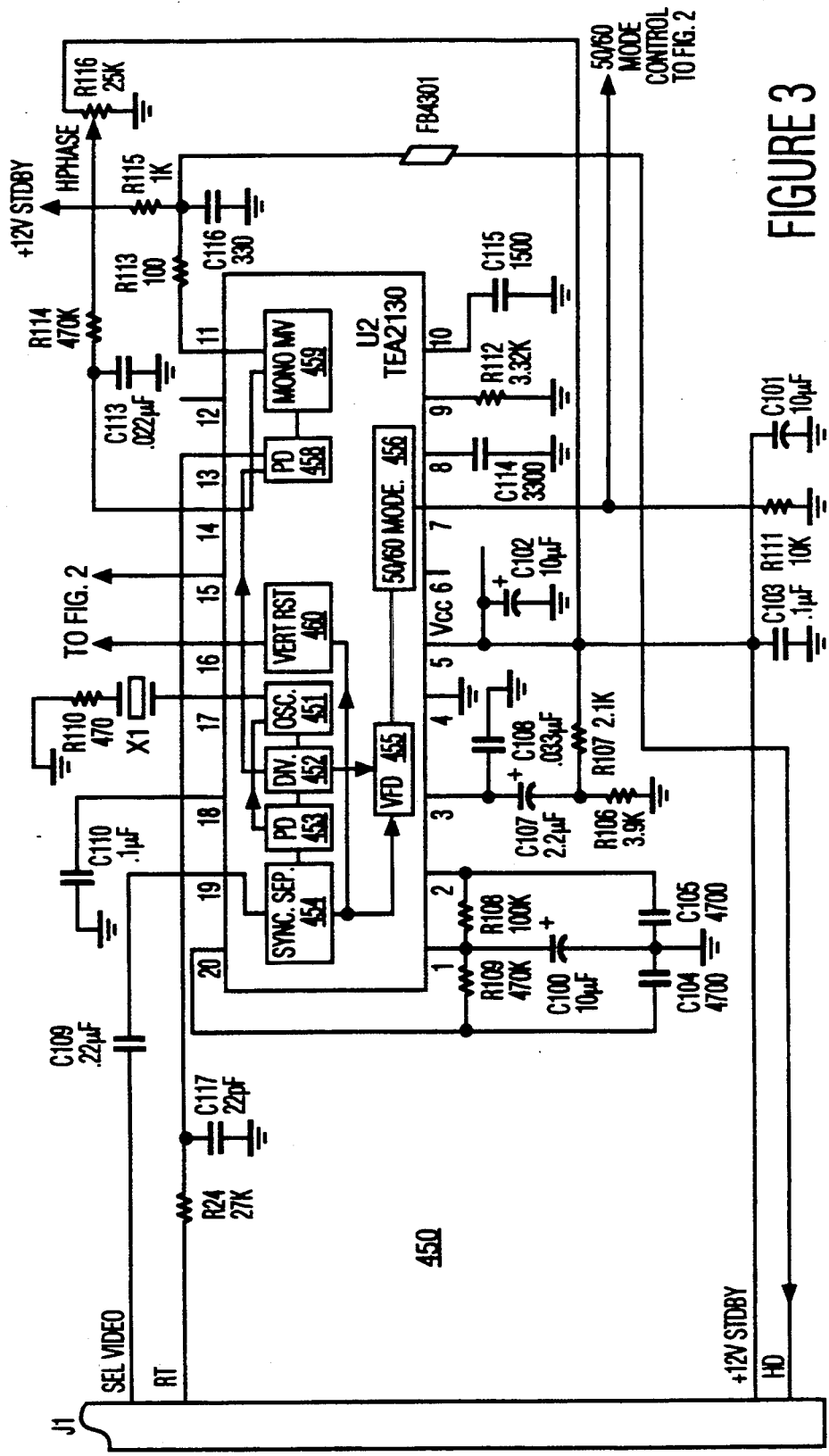
FIG. 3 is an electronic schematic drawing showing synchronizing circuitry of circuit 400.
Figure 4:
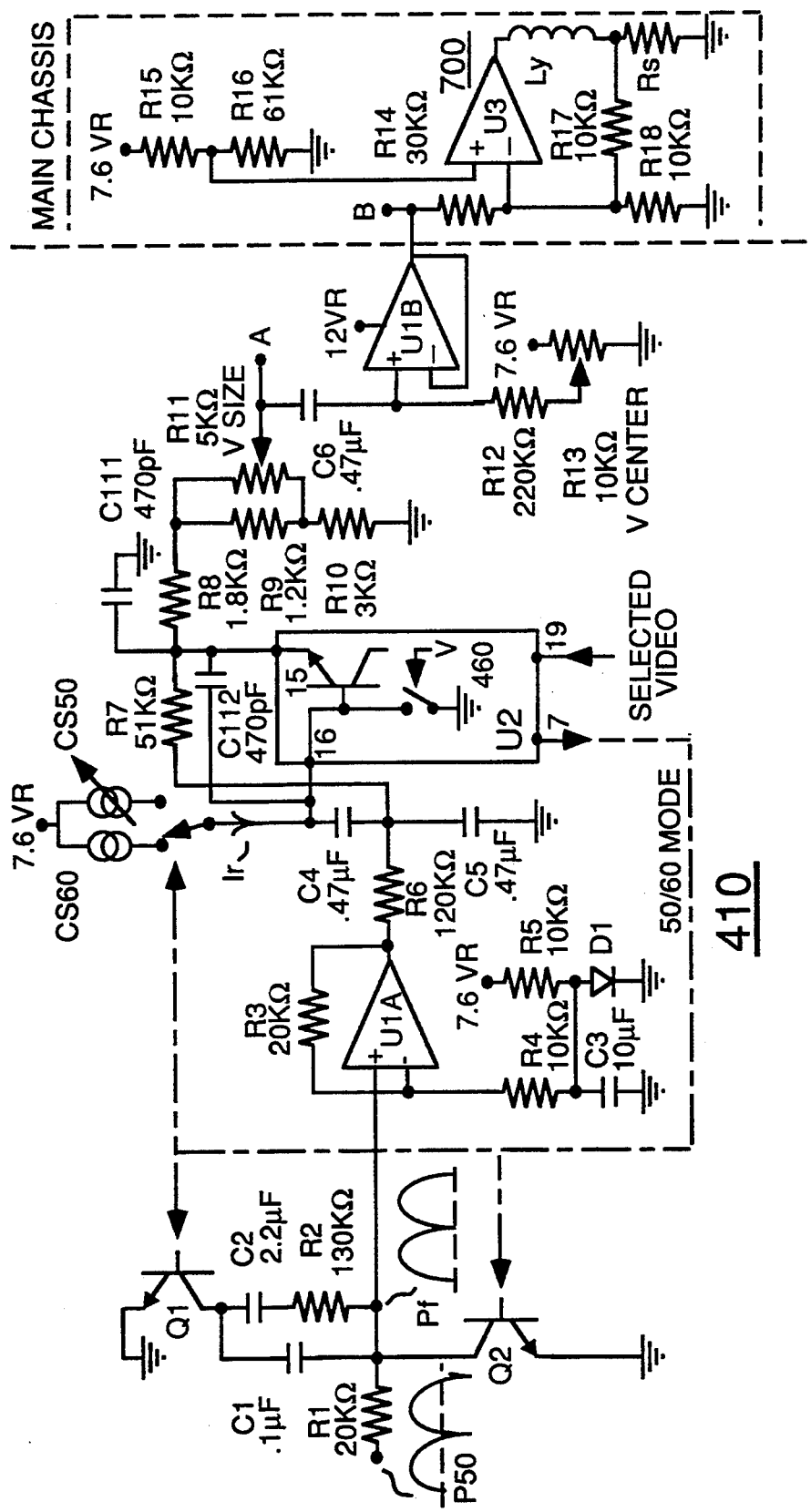
FIG. 4 is a simplified electronic schematic drawing of FIG. 2 illustrating an inventive embodiment.

An inventive multistandard vertical deflection waveform generator is shown in FIG. 4 and described in detail with reference to FIGS. 5 and 6. However, the remaining circuitry shown in FIGS. 2 and 3 is now described. A multistandard vertical ramp waveform is generated by charging a series connected pair of capacitors from a selectable constant current source. The capacitors are discharged by a vertical rate reset switch within IC U2. There are two current sources, CS50 and CS60 which are enabled by a 50/60 mode control signal generated by IC U2. The mode control signal is connected to the base of transistor Q5 via a resistor R22. The emitter of transistor Q5 is biased to approximately 8.4 volts by a series connected voltage divider formed by resistors R25, R26 connected between the 12 volt run power supply and ground. When a 50 Hz field rate signal is detected the 50/60 mode control signal assumes a potential of approximately 11 volts which turns off transistor Q5. The collector of transistor Q5 is connected to a pair of series connected resistive voltage dividers. The voltage dividers are connected to ground and are comprised of resistors R29, R30 and resistors R61, R62. The junction of resistors R29, R30 is coupled to the base of transistor Q4, causing transistor Q4 to turn off when transistor Q5 ceases conduction. The junction of resistors R61, R62 is coupled to the base of a 60 Hz current switch transistor Q61 which is also off in the 50 Hz mode.

The 50/60 mode control signal is also coupled to the base of a transistor Q3 via a series resistor R31. In the absence of reference video coupled to IC U2, the 50/60 mode control signal assumes a zero volt potential which turns off transistor Q3. The collector of transistor Q3 is coupled to the base of transistor Q2 and to a load resistor R32 which is connected to the 12 volt run supply. Hence during signal absence, transistor Q3 is turned off which allows transistor Q2 to be saturated by current flow from the 12 volt run supply via resistor R32. Thus during signal absences, the collector of transistor Q2 clamps the input of amplifier U1A to ground and removes the parabolic input signal from the "S" correction generator circuitry.

The 50 Hz constant current source CS 50, is generated at the collector of a PNP transistor Q50, the emitter of which is connected to a +7.6 volt run supply via a series resistor R51. The base of the current source transistor is driven by an output from an integrated circuit amplifier U1D which is configured as a voltage follower that includes the base emitter voltage of transistor Q50 in the voltage feedback path. A non-inverting input of amplifier U1D is connected to the wiper of a potentiometer R54 which determines vertical size at 50 Hz field rates. The 50 Hz size control is connected in parallel with a fixed resistor R53, one end of which is coupled to the +7.6 volt run supply via a series resistor R52, the other end being connected to the collector of a saturated switch transistor Q51. The emitter of switch transistor Q51 is connected to ground and the base is coupled to the collector of switch transistor Q4 via a series connected resistor R23. Thus as described earlier, in the 50 Hz field mode, transistor Q4 is turned off and resistor R23 is effectively connected to the +12 volt run supply via resistor R27. Thus current is coupled which saturates transistor Q51 coupling the 50 Hz size network to ground. The wiper potential of R54 is coupled via voltage follower U1D to set the Vbe potential of transistor Q50 which determines the collector current and hence the ramp forming current Ir. The 50 Hz size control R54, is adjusted to make the 50 Hz ramp of equal amplitude to that generated at 60 Hz field rate by current source CS 60. In 60 Hz operation transistor Q51 is turned off and the wiper potentiometer R54 assumes a potential of approximately the +7.6 volt run supply. Thus approximately +7.6 volts is applied to the base of transistor Q50 turning it off and preventing 50 Hz charging current flow.

The 60 Hz current source CS60 is configured similarly to that of the 50 Hz source, with the exception that the non-inverting input of voltage follower U1C is connected to a potential divider formed by fixed resistors R64 and R63. Resistor R64 is connected to the +7.6 volt run supply and resistor R63 is connected to the collector of a saturated switching transistor Q61. The base of switching transistor Q61 is coupled the junction of series connected load resistors R61, R62, of transistor Q5. Thus, in the 60 Hz mode, the 50/60 mode control signal is at a nominal voltage of 7 volts, turning on transistor Q5, causing the junction of series connected resistors R62, R61 to be positive. Thus transistor Q61 is saturated, grounding resistor R63 which initiates current flow in current source transistor Q60.

FIG. 4 is a partial electronic schematic of the vertical deflection waveform generator 410, depicted in FIGS. 1 and 2, and shows a multistandard vertical deflection waveform generator employing an inventive arrangement. The circuitry shown in FIG. 4 generates a vertical rate sawtooth, or ramp shaped signal for coupling to a vertical deflection amplifier 700. The ramp is also fed back to the junction of the series connected ramp forming capacitors to provide linearity correction. The vertical ramp is modified further to correct for "S" distortion of the displayed image. The "S" correction signal is generated by integration of the vertical rate parabolic signal, East-West, generated within circuit 115 and output by circuit generator 120 of IC 100. The corrected vertical ramp is coupled via a size control and is AC coupled to an input of a voltage follower amplifier. The input is also coupled to a potentiometer which sets the DC potential of the ramp signal and thus determines the vertical centering of the raster on the CRT display since the remaining deflection circuitry is directly coupled.

Selected video from selector 104 of IC 100 on the main receiver chassis is coupled via connector J1 to integrated circuit U2 pin 19, for example TEA 2130, which comprises a synchronizing pulse separator 454, and a phase locked ceramic oscillator 451 operating at 32 times horizontal rate, approximately 500 KHz. The oscillator signal is counted down to produce horizontal rate pulses for horizontal rate phase comparison in phase detector 453, and is counted further to generate timing windows for vertical frequency determination by circuitry of 455. The vertical frequency determination circuitry 455 is coupled to 50/60 mode control logic 456 which generates a control signal indicative of the vertical frequency of the selected video signal.

A vertical rate ramp is generated by, for example, current source CS 60, which charges series connected capacitors C4 and C5 positively. The ramp signal is connected to a input pin 16 of IC U2, which comprises a buffer amplifier and shunt connected switch 460. The switch 460 discharges the ramp forming capacitors to ground potential responsive to a vertical pulse derived from the selected video signal. The buffered ramp signal is output from U2 pin 15 and is coupled to an amplitude determining network. The output ramp is also decoupled to ground by a capacitor C111, which provides high frequency decoupling. The output ramp is also coupled to the input by a capacitor C112 to prevent RFI and instability problems. The amplitude determining network is formed by series resistors R8, R9 and R10 with a potentiometer R11, which determines vertical deflection size connected across resistor R9.

The wiper of potentiometer R11 is AC coupled by a capacitor C6 to a non-inverting input of voltage follower amplifier U1B. The selection of value for capacitor C6 represents a compromise between settling time and distortionless ramp coupling. For example, following a channel change, and particularly when selecting between channels having differing field rates, the raster may slowly assume the same vertical size and position if the value of capacitor C6 is large. Hence for user considerations, a small value of capacitance is selected for capacitor C6, this produces a short, less than 1 second, settling time following a channel change. However, a small value coupling capacitor results in a coupling time constant which is too short for distortionless coupling of the ramp. Thus the vertical ramp is partially differentiated resulting in vertical non-linearity of the raster.

The non-inverting input of voltage follower amplifier U1B is also coupled via a resistor R12, to the wiper of potentiometer R13 which determines vertical centering of the raster. The output from voltage follower U1B is directly coupled via connector J1 to the vertical deflection amplifier 700 on the main chassis. The deflection ramp is coupled via a series resistor R14 which is connected to the inverting input of an amplifier U3, for example an integrated circuit TDA 8172. The non-inverting input of amplifier U3 is connected to a positive potential produced by a potential divider formed by resistors R15 and R16. The output of amplifier U3 is DC coupled to a vertical deflection coil Ly, which is coupled to zero signal potential via a current sensing resistor R18. The voltage developed across resistor R18 is coupled back to provide negative feedback at the inverting input of the vertical deflection drive amplifier U3.

The buffered ramp signal output at integrated circuit U2 is also advantageously coupled via a resistor R7, as a feedback signal to the junction of the series connected ramp capacitors C4, C5. The time constant of resistor R7 and capacitors C4, C5 result in integration of the ramp signal to produce a parabolic shaped component. The parabolic component is added in phase to the ramp signal to provide pre-correction of non-linearity that will result from coupling capacitor C6. Waveform (A) of FIG. 6 depicts the pre-corrected or pre-linearized ramp, observed at the wiper of the vertical size control R11, point A, prior to coupling capacitor C6. The result of coupling the pre-corrected vertical ramp through capacitor C6 may be observed at circuit point B and is depicted by the linear ramp shown in waveform (B1) of FIG. 6. The linearized vertical ramp in waveform (B1) is depicted without "S" correction obtained by disconnecting resistor R6. In FIG. 6 waveforms (A) and (B) are separated by a dimension marked L which illustrates the magnitude of linearity correction required to achieve a linear ramp signal. The "S" correction signal is restored and the vertical deflection waveform with non-linearity corrected and "S" correction added is observed at point B, as waveform (B2) of FIG. 6.

The East-West vertical frequency parabola, generated by generator 115 and processed by parabola amplifier 120 of IC 100, is advantageously coupled to the junction of ramp forming capacitors C4 and C5 via resistor R6. Resistor R6 and capacitor C5 form an integrator which integrates the East-West parabola to produce an "S" correction signal which is added to the vertical ramp signal.

Integrated circuit U2 detects the vertical frequency of the selected video signal by vertical frequency detector 455, which gates the occurrence of the vertical sync pulses with a window signal formed by counting down in divider 452, the oscillator frequency signal from oscillator 451. For example, a vertical pulse occurring during an interval between line counts of 247–277 is indicated to be a 60 Hz field rate signal which sets the 50/60 mode control logic 456 output control signal to a nominal value of 6 volts. Similarly a vertical pulse occurring between line counts of 277–361 is indicated to be a 50 Hz field rate signal and the 50/60 mode control logic 456, output signal is set to nominally 11 volts. When the selected video signal is absent, during tuning etc., the vertical frequency detector 455, sets the 50/60 mode control logic output signal to nominally zero volts. Switching circuitry responsive to the 50/60 mode control signal values, is not shown in simplified FIG. 4, but is illustratively depicted by the dashed lines.

The mode control logic signal selects constant current source CS60 for 60 Hz operation and CS50 for 50 Hz field rate. The selected source generating charging current It, which is coupled to series connected capacitors C4 and C5. To achieve equal raster heights, constant current source CS50 is adjustable which enables the 50 Hz ramp amplitude to be matched to that of the 60 Hz ramp. When the selected video is absent it is important that the vertical deflection signals continue to be generated without undue perturbations. Thus, during loss of selected video the 50/60 mode control signal assumes a ground potential which causes the parabola signal to be clamped to ground. Thus the possibility of unwanted, spurious deflection waveform shaping is prevented. The mode control signal is also coupled to an inventive selectable filter and amplitude control to be described in greater detail subsequently.

The parabola is formed by a squaring function amplifier 115, which processes a vertical rate sawtooth signal generated by generator 114. The parabolic signal amplitude, and DC component value to which the parabola is added, are digitally controlled by circuit 120, of FIG. 1. However, the peak parabola amplitude is controlled by a loop within squaring circuit 115 that is referenced to an instantaneous sawtooth voltage occurring at a particular line in the field. At 60 Hz field rates, a line number is selected which positions the parabolic signal peak in the center of the field. The requirement for centering the parabolic peak is the same when operating at 50 Hz scanning rates. However, a 50 Hz field period is 20 milliseconds duration and has a field line count of approximately 312, hence the center field line number is different to that of a 60 Hz system. Thus, without changing the center line number, the parabolic waveform peak is produced too early and consequently is not centered in the 50 Hz field interval. In addition, the parabolic waveform continues to be generated by squaring circuit 115, for the remaining, approximately 3.33 milliseconds of the 20 millisecond 50 Hz field period. This results in an asymmetrical parabolic waveshape having dissimilar cusps and thus a greater peak to peak amplitude than a 60 Hz signal. The asymmetrical parabolic waveshape is depicted by waveform P50, in FIG. 5.

Figure 5:
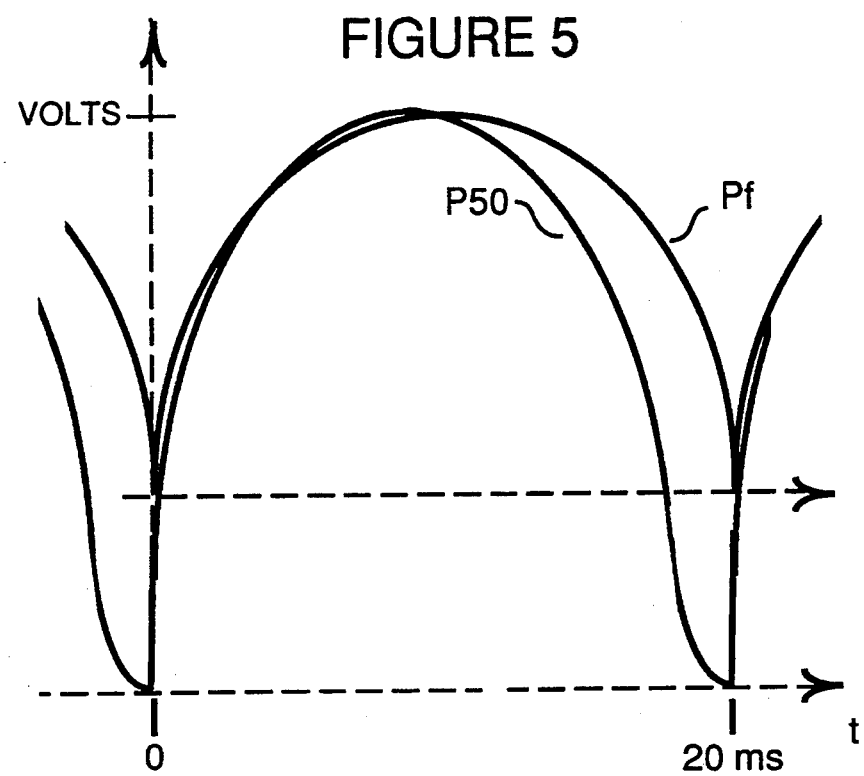
FIG. 5 illustrates an asymmetrical and a filtered parabolic waveform signal.
Figure 6:
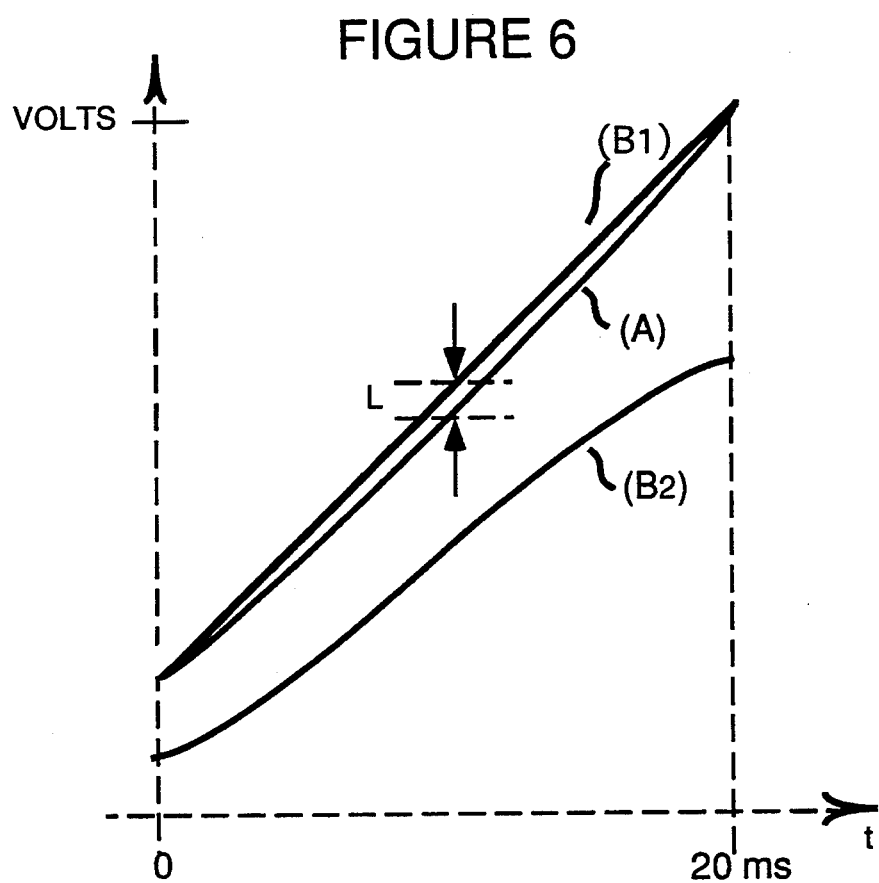
FIG. 6 illustrates various vertical deflection waveforms.

The asymmetrical parabolic signal, P50 in FIGS. 4 and 5, is coupled from parabolic signal amplifier 120 via connector J1 to a series coupled input resistor R1, of vertical deflection waveform generator 410. Resistor R1 and capacitor C1 form an inventive low pass filter which is selectively activated by a switch transistor Q1. Switch transistor Q1 is biased, (by a network shown in FIG. 2), such that it is turned on when the 50/60 mode control signal indicates 50 Hz operation with a nominal DC voltage of 11 volts. Thus transistor Q1 is saturated which connects filter capacitor C1 to ground forming a lowpass filter with a corner frequency of approximately 80 Hz, and having the well known amplitude response slope of 6 dB per octave above the corner frequency. Thus the filter attenuates the second and higher order harmonics of the parabola and largely removes the asymmetry from waveform P50, resulting in the generally symmetrical parabolic waveform depicted by waveform Pf in FIGS. 4 and 5.

Asymmetrical parabolic waveform P50 also has a greater peak to peak amplitude as depicted in FIG. 5, than a 60 Hz parabolic signal, thus during 50 Hz operation it is necessary to reduce the overall amplitude of the P50 signal. A series connected network formed by a resistor R2 and a capacitor C2 is connected across capacitor C1 and is thus also, selectively switched to ground during 50 Hz operation. The series combination of resistor R2 and capacitor C2 form an attenuator with input resistor R1. The value of capacitor C2 is such that the attenuation results from the potential divider action of resistors R1 and R2, and is essentially constant across the frequency spectrum of the P50 signal. Thus, in the 50 Hz mode the attenuator is selected and the 50 Hz parabola is reduced in amplitude by approximately 13%. When operating in the 60 Hz mode, transistor Q1 is off and the low pass filter and attenuator network are inoperative. Thus a 60 Hz parabolic signal from IC 100 is coupled to the noninverting input of amplifier U1A without attenuation or filtering.

As described earlier, the parabolic signal comprises an AC and a DC component, these components are individually controlled and may be used in some versions of the basic receiver design. However, in this multistandard receiver the DC component is not required and is therefor advantageously removed in amplifier U1A by the subtraction of a fixed DC bias generated across diode D1 and applied to the inverting input.

The inverting input of amplifier U1A is coupled to the amplifier output, via a resistor R3, to provide negative feedback. The inverting input is also connected via a resistor R4, to a DC biasing network formed a resistor R5, a diode D1 and a decoupling capacitor C3. Resistor R5 is connected to a 7.6 volt run supply and provides a forward bias current to the anode of diode D1, the cathode of which is connected to ground. The junction of resistor R5 and diode D1 anode is connected to capacitor C3, which provides decoupling to ground, and to resistor R4. Thus, resistor R4 couples a DC bias of approximately +0.7 volt to the inverting input of amplifier U1A. Since the impedance of capacitor C3 is negligible across the frequency spectrum of the parabolic signal, the gain of amplifier U1A is determined by the well known equation (1+R3/R4), yielding a gain of 3.

The output signal from amplifier U1A is coupled via a resistor R6 to ramp forming capacitor C5. The time constant of resistor R6 and capacitor C5 provide integration of the processed East-West parabolic signal. The value of resistor R6 is selected to provide vertical "S" correction for the display surface geometry of the CRT.

The inventive selectively switched filter generates a parabolic signal having substantially the same waveform symmetry in both 50 Hz and 60 Hz operating modes. The selective control of parabolic signal amplitude advantageously generates a parabolic signal having substantially the same amplitude in both 50 Hz and 60 Hz operating modes. The inventively controlled parabolic signal may be advantageously coupled to a coil to provide correction of electron beam error. The electron beam error being corrected may for example be a geometrical S landing error as described above, or may be correction of other errors involving the use of a coil responsive to a parabolic signal.

What is claimed is:

1. A scanning waveform generators, comprising:
   means for generating a switching signal, said switching signal having a first state indicative of a video signal operating at a first scanning frequency and having a second state indicative of said video signal operating at a second scanning frequency;
   means responsive to said switching signal for generating a sawtooth shaped signal at one of said first and said second scanning frequencies;
   a source of a parabolically shaped signal synchronized with said video signal scanning frequency;
   means for generating an S correction signal coupled to said source and to said sawtooth signal generating means; and,
   means coupled to said S correction signal generating means for filtering said parabolically shaped signal responsive to said switching signal generator, said filtering means generating a filtered parabolic signal having substantially the same shape during scanning operation at either one of said first and said second scanning frequencies.

2. The scanning waveform generator of claim 1, wherein said switching signal is additionally indicative of an absence of said video signal.

3. The scanning waveform generator of claim 1, wherein said filtering means is activated responsive to said switching signal indicative of said first scanning frequency.

4. The scanning waveform generator of claim 1, wherein said filtering means is inactivated responsive to said switching signal indicative of said second scanning frequency.

5. The scanning waveform generator of claim 2, wherein coupling to said S correction signal generating means is inhibited responsive to said switching signal indicative of said absence of said video signal.

6. The scanning waveform generator of claim 1, wherein said first scanning frequency is nominally 50 Hz and said second scanning frequency is nominally 60 Hz.

7. The scanning waveform generator of claim 6, wherein said 50 Hz or said 60 hz scanning frequency is automatically detected by said means for generating a switching signal.

8. The scanning waveform generator of claim 3, wherein said filter comprises a resistor and capacitor low pass filter.

9. A scanning waveform generators, comprising:
   means for generating a switching signal, said switching signal having a first state indicative of a video signal operating at a first scanning frequency and having a second state indicative of said video signal operating at a second scanning frequency;
   means responsive to said switching signal for generating a sawtooth shaped signal at one of said first and said second scanning frequencies;
   a source of a parabolically shaped signal synchronized with said video signal scanning frequency;
   means for generating an S correction signal coupled to said source and to said sawtooth signal generating means; and,
   means coupled to said S correction signal generating means and responsive to said switching signal generator for controlling an amplitude of said parabolic signal, to maintain substantially the same S correction signal amplitude during scanning operation at either one of said first and said second scanning frequencies.

10. The scanning waveform generator of claim 9, wherein said amplitude controlling means is activated responsive to said switching signal indicative of said first scanning frequency.

11. The scanning waveform generator of claim 9, wherein said amplitude controlling means is inactivated responsive to said switching signal indicative of said second scanning frequency.

12. The scanning waveform generator of claim 10 wherein said amplitude controlling means attenuates said parabolic signal responsive to said switching signal indicative of said first scanning frequency.

13. The scanning waveform generator of claim 12, wherein said first scanning frequency is nominally 50 Hz and said second scanning frequency is nominally 60 Hz.

14. A parabolically shaped signal generator comprising:
   an amplifier coupled to a coil for generating a current therein;
   means for generating a switching signal, said switching signal having a first state indicative of a video signal operating at a first scanning frequency and having a second state indicative of said video signal operating at a second scanning frequency;
   a source of a parabolically shaped signal operable at said first or said second scanning frequency; and, means controllably coupled to said switching signal generator for filtering said parabolically shaped signal, said filtering means having an output signal coupled to said amplifier for correction of electron beam error, said output signal having substantially the same shape during scanning operation at either one of said first and said second scanning frequencies.

15. The parabolic shaped signal generator of claim 14, wherein said source being operable at said first scanning frequency generates an asymmetrically shaped parabolic signal.

16. The parabolic shaped signal generator of claim 15, wherein said filtering means is operable at said first scanning frequency.

17. The parabolic shaped signal generator of claim 14, wherein said source being operable at said second scanning frequency generates a substantially symmetrically shaped parabolic signal.

18. The parabolic shaped signal generator of claim 14, wherein said filtering means is inoperable at said second scanning frequency.

19. The scanning waveform generator of claim 1, wherein said filtering means further comprises an amplitude controlling means activated responsive to said switching signal indicative of said first scanning frequency.

20. The scanning waveform generator of claim 9, wherein said amplitude controlling means further comprises a filter activated responsive to said switching signal indicative of said first scanning frequency.

* * * * *

UNITED STATES PATENT AND TRADEMARK OFFICE
CERTIFICATE OF CORRECTION

PATENT NO. : 5,412,290
DATED : May 2, 1995
INVENTOR(S) : Kenneth Jay Helfrich

It is certified that error appears in the above-identified patent and that said Letters Patent is hereby corrected as shown below:

Claim 1 Column 9, line 41,
delete "generators" and replace with --generator--.

Claim 9 Column 10, line 20,
delete "generators" and replace with --generator--.

Signed and Sealed this

Eighteenth Day of July, 1995

Attest:

BRUCE LEHMAN

Attesting Officer      Commissioner of Patents and Trademarks